United States Patent
Dress et al.

(10) Patent No.: US 7,876,836 B2
(45) Date of Patent: *Jan. 25, 2011

(54) PRECISION TIMING PULSE WIDTH COMMUNICATIONS

(75) Inventors: William B. Dress, Camas, WA (US); Brian Donovan, Vancouver, WA (US)

(73) Assignee: Lightfleet Corporation, Vancouver, WA (US)

( * ) Notice: Subject to any disclaimer, the term of this patent is extended or adjusted under 35 U.S.C. 154(b) by 144 days.

This patent is subject to a terminal disclaimer.

(21) Appl. No.: 11/543,384

(22) Filed: Oct. 4, 2006

(65) Prior Publication Data

US 2007/0025437 A1 Feb. 1, 2007

Related U.S. Application Data

(63) Continuation of application No. 10/175,621, filed on Jun. 20, 2002, now Pat. No. 7,136,419.

(51) Int. Cl.
 *H04B 14/04* (2006.01)
(52) U.S. Cl. .................................. 375/242
(58) Field of Classification Search ............. 375/267, 375/299, 347, 349, 242, 238, 256, 260, 261, 375/237, 239; 700/53; 333/106, 112, 103, 333/149

See application file for complete search history.

(56) References Cited

U.S. PATENT DOCUMENTS

| | | | |
|---|---|---|---|
| 3,995,525 A | 12/1976 | Blair | |
| 4,912,526 A | 3/1990 | Iwaoka et al. | |
| 5,002,395 A | 3/1991 | Shah | |
| 5,101,294 A * | 3/1992 | Jain et al. | 359/285 |
| 5,146,358 A | 9/1992 | Brooks | |
| 5,311,196 A * | 5/1994 | Hanson et al. | 342/368 |
| 5,987,601 A | 11/1999 | Donovan | |
| 6,151,149 A | 11/2000 | Rybicki et al. | |
| 6,341,023 B1 | 1/2002 | Puc | |
| 6,862,317 B1 * | 3/2005 | Mohan et al. | 375/238 |

FOREIGN PATENT DOCUMENTS

| | | |
|---|---|---|
| EP | 0 829 978 | 3/1998 |
| WO | WO 01/28121 | 4/2001 |
| WO | WO 01/99283 | 12/2001 |

OTHER PUBLICATIONS

International Search Report for App. No. PCT/US03/19175 mailed Oct. 9, 2003.

* cited by examiner

*Primary Examiner*—Sam K Ahn
(74) *Attorney, Agent, or Firm*—John Bruckner PC

(57) ABSTRACT

Systems and methods are described for pulse communications using precision timing. A method includes digitally pulse coding a data stream; and modulating a carrier signal using the digitally pulse coded data stream.

5 Claims, 13 Drawing Sheets

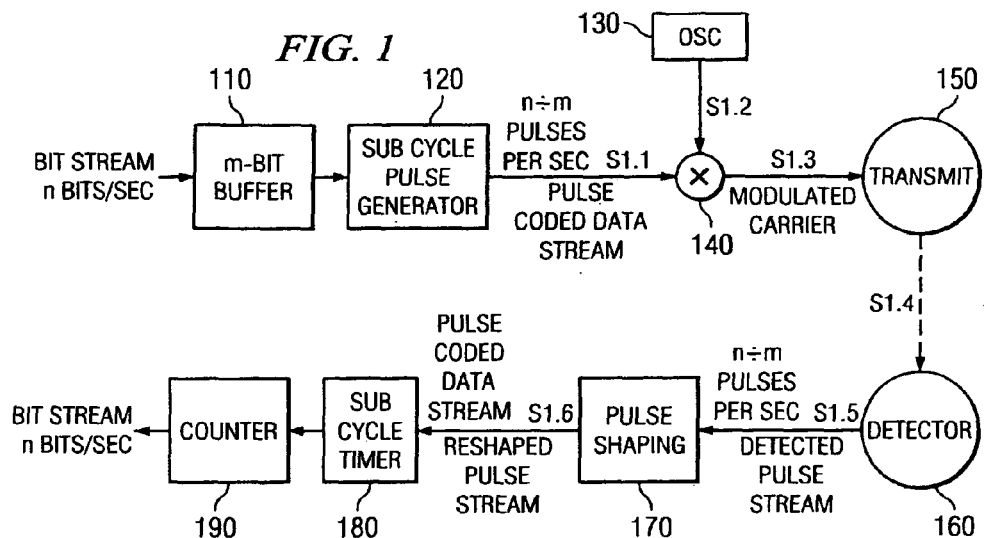
FIG. 2A (PRIOR ART)
FIG. 2B (PRIOR ART)
FIG. 2C (PRIOR ART)
FIG. 2D (PRIOR ART)
FIG. 2E (PRIOR ART)
FIG. 2F (PRIOR ART)

S7.1

S7.2

S7.3

S7.4

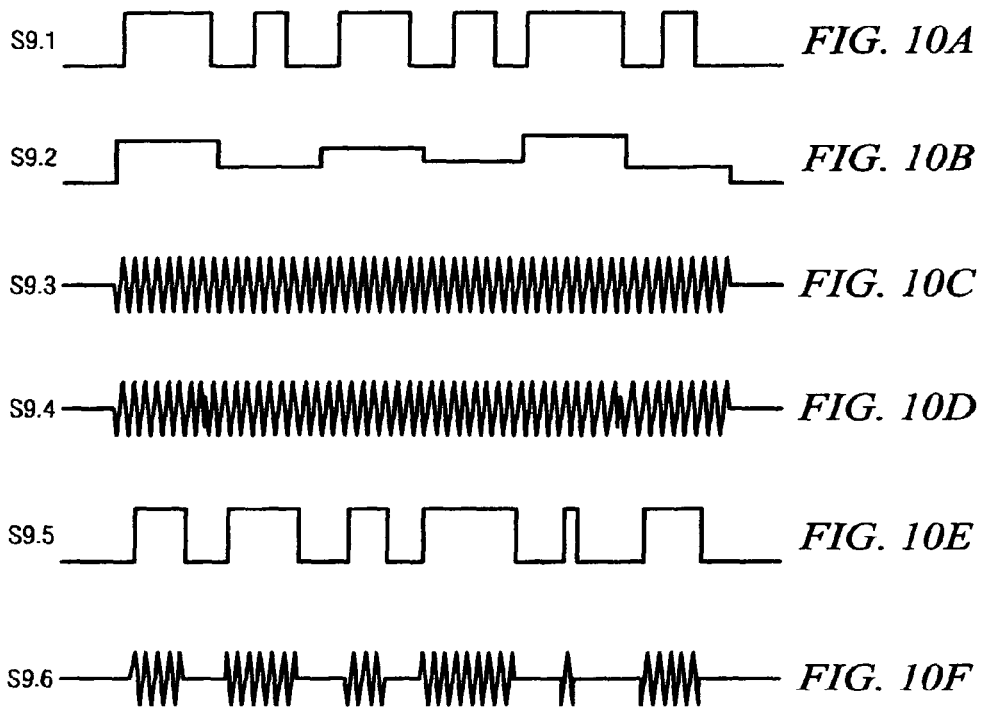
FIG. 10A
FIG. 10B
FIG. 10C
FIG. 10D
FIG. 10E
FIG. 10F
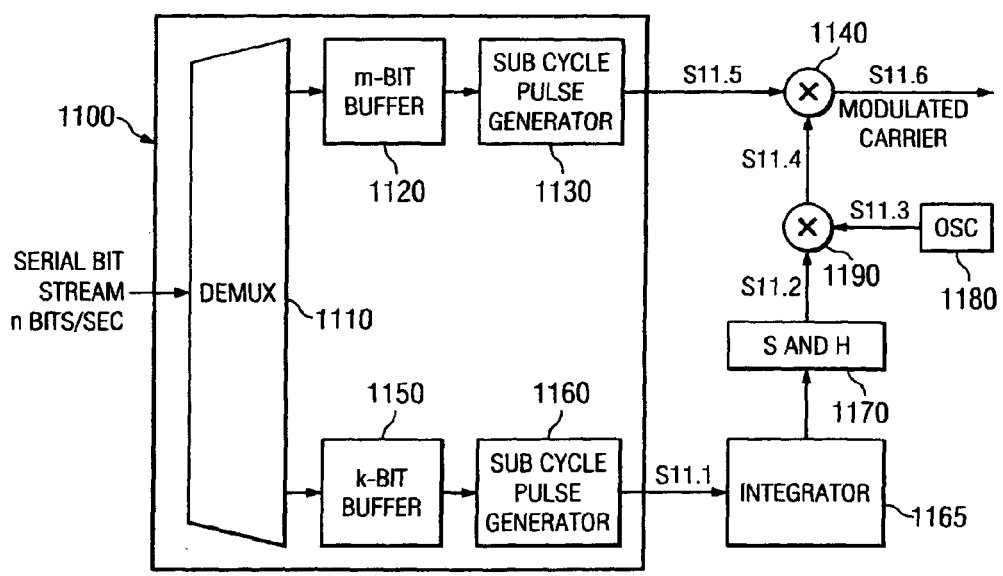
FIG. 11

S11.1

S11.2

S11.3

S11.4

S11.5

S11.6

S13.1

S13.2

S13.3

S13.4

S13.5

S13.6

S13.7

S13.8

S13.9

S13.10

S13.11

S15.1                                                                                           FIG. 16A
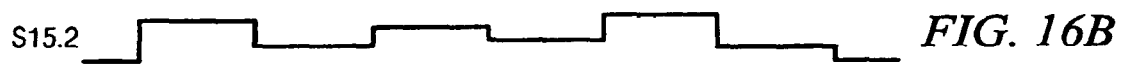
S15.2                                                                                           FIG. 16B
S15.3                                                                                           FIG. 16C
S15.4                                                                                           FIG. 16D
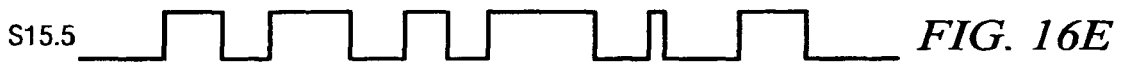
S15.5                                                                                           FIG. 16E
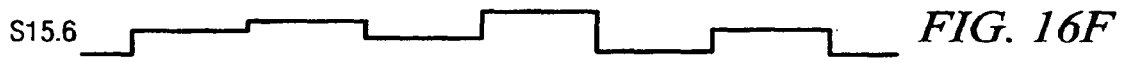
S15.6                                                                                           FIG. 16F
S15.7                                                                                           FIG. 16G
S15.8                                                                                           FIG. 16H
S15.9                                                                                           FIG. 16I

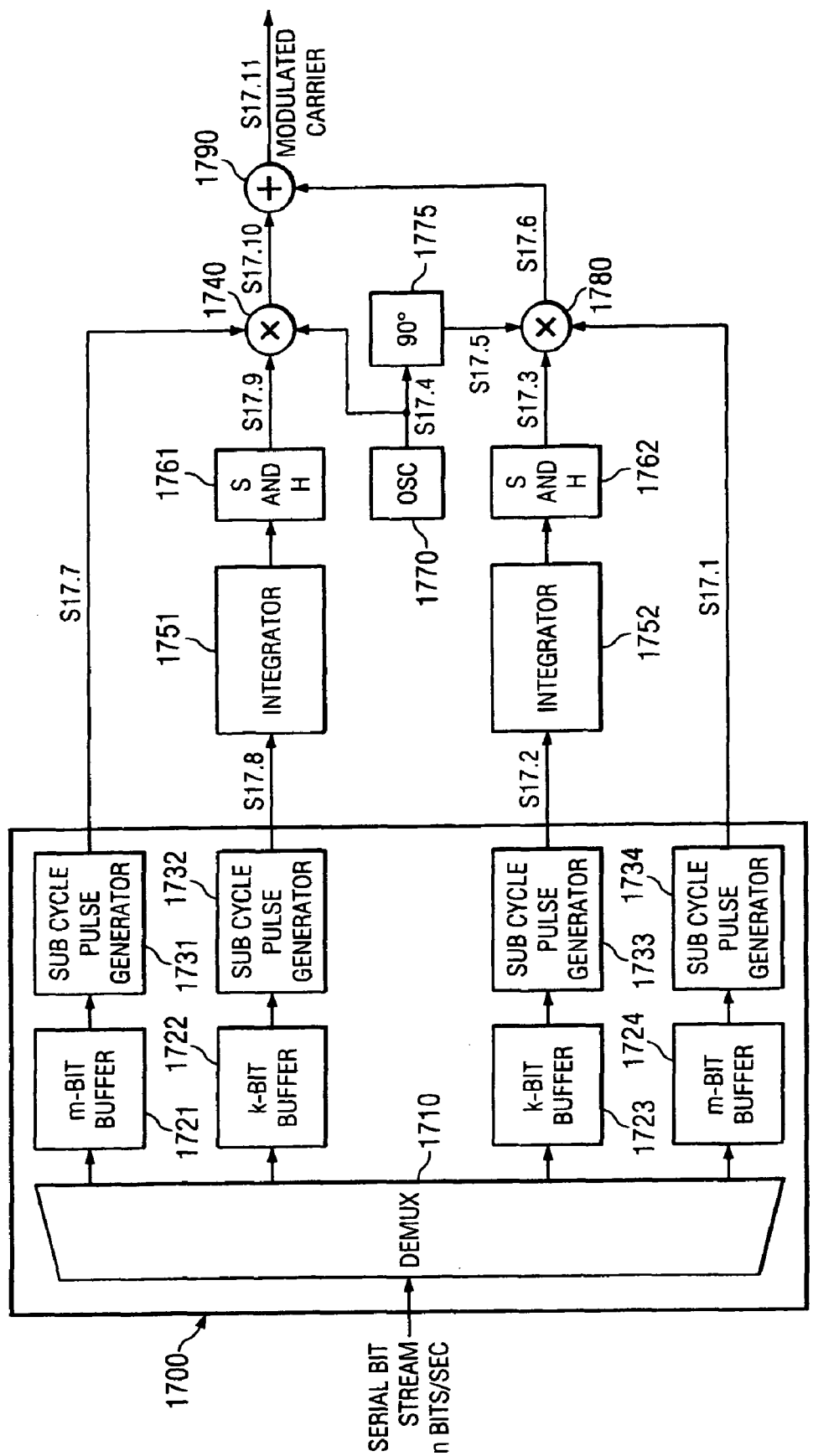

S19.1 — FIG. 20A
S19.2 — FIG. 20B
S19.3 — FIG. 20C
S19.4 — FIG. 20D
S19.5 — FIG. 20E
S19.6 — FIG. 20F
S19.7 — FIG. 20G

PRECISION TIMING PULSE WIDTH COMMUNICATIONS

CROSS-REFERENCE TO RELATED APPLICATION

This application is a continuation of, and claims a benefit of priority under 35 U.S.C. 120 from utility or design patent application U.S. Ser. No. 10/175,621, filed Jun. 20, 2002, (now U.S. Pat. No. 7,136,419, issued Nov. 14, 2006) the entire contents of which are hereby expressly incorporated herein by reference for all purposes.

BACKGROUND OF THE INVENTION

1. Field of the Invention

The invention relates generally to the field of pulse width communications using precision timing. More particularly, the invention relates to the field of pulse width data transfer using timing that is based on a sub-cycle of the clock controlling a digital circuit.

2. Discussion of the Related Art

Prior art modulation and demodulation techniques are known to those skilled in the art of data transfer. For instance, a conventional modulation technique typically includes modulating a carrier signal with a data signal and then transmitting the modulated carrier. At a receiver, the modulated carrier is demodulated, thereby recovering the data signal. The prior art teaches various methods of time, duration (e.g., pulse-width), amplitude, frequency, phase and acousto-optic modulation.

A problem with conventional approaches is that the demand for bandwidth is growing more quickly than the rate at which the speed of conventional modulation techniques can be increased. Increasing the speed of conventional approaches is limited by the rate at which the speed of the underlying hardware can be increased. Maximizing the speed of available hardware is exponentially costly.

In the past, conventional systems have been aggregated in parallel to provide increased bandwidth. However, a disadvantage of parallel aggregation has been relatively high cost. As the bandwidth provided increases, the cost of the parallel system increases roughly linearly. What is needed is an approach that provides increased bandwidth for data transfer in a more cost-effective manner.

Another problem with parallel systems is that the amount of available spectrum is limited. Aggregating conventional systems in parallel consumes spectrum in a roughly linear manner. What is also needed is a solution that provides more bandwidth for data transfer without occupying more spectrum.

In an effort to satisfy the high data rates required by modern communication systems, modulation of two states of an RF carrier or laser beam has been utilized. A previous approach, involves quadrature amplitude modulation/demodulation. For example, FIG. 3 shows a conventional amplitude-phase modulation approach.

FIG. 3 schematically illustrates a typical circuit for quadrature modulation of a carrier by a bit stream, partitioned into two halves, each half segmented and converted into a sequence of amplitude changes that are then used to modulate both phases of an oscillator signal. The system show in FIG. 3 sums an in-phase carrier that has been amplitude modulated (n/2m amplitude changes/second) with a 90° phase shifted carrier that has been amplitude modulated (n/2k amplitude changes/second).

Referring to FIG. 3, a serial bit stream is split by a demux 310 into a first stream that is fed to a first m-bit buffer 320 and a second stream that is feed to a second m-bit buffer 330. A first modulator 340 is coupled to the first m-bit buffer 320 via a first digital to analog converter 350. A second modulator 360 is coupled to the second m-bit buffer 330 via a second digital to analog converter 370. An oscillator 380 is coupled to the first modulator or mixer 340 and to, via a 90° phase shift 390, the second modulator or mixer 360. The output from the first and second modulators 340, 360 is summed and then sent-on for transmission. The resulting signal is then transmitted for reception at a receiver (not shown in FIG. 3).

FIGS. 4A-4G depict waveforms for selected points of the system shown in FIG. 3. FIG. 4A shows a signal at point S3.1 of FIG. 3. FIG. 4B shows a signal at point S3.2 of FIG. 3. FIG. 4C shows a signal at point S3.3 of FIG. 3. FIG. 4D shows a signal at point S3.4 of FIG. 3. FIG. 4E shows a signal at point S3.5 of FIG. 3. FIG. 4F shows a signal at point S3.6 of FIG. 3. FIG. 4G shows a signal at point S3.7 of FIG. 3.

A problem with conventional quadrature amplitude modulation is that it relies on conventional digital-to-analog conversion for the modulation and conventional analog-to-digital conversion for the demodulation. For high-speed applications, these converters are stand-alone modules not residing in the main processing package (chip). This makes timing issues more critical and requires more on- and off-chip communications that involve data reads and writes over a bus that must be managed by an auxiliary controller. Therefore, what is needed is a solution that does not make timing issue more critical or require more on- and off-chip communications.

The problems and needs discussed above apply to radio frequency (RF), laser, acoustic or light carrier or beam. Therefore, what is needed is an inexpensive and efficient method of modulating and demodulating an RF, laser, acoustic or light carrier or beam for commercial high-speed data transmission systems.

Heretofore, the requirements of economy, spectrum efficiency, and circuit design and operation simplicity referred to above have not been fully met. What is needed is a solution that addresses, preferably all of, these requirements.

SUMMARY OF THE INVENTION

There is a need for the following aspects of the invention. Of course, the invention is not limited to these aspects.

According to an aspect of the invention, a method, comprises: pulse coding a data stream; and modulating a carrier signal using the pulse coded data stream, characterized in that the data stream is pulse coded with a digital circuit. According to another aspect of the invention, a method, comprises: detecting a pulse stream from a pulse code modulated carrier signal; transforming the pulse stream into a reshaped pulse stream; transforming the reshaped pulse stream into a counter gate stream; and recovering a data stream from the counter gate stream, characterized in that the reshaped pulse stream is transformed into the counter gate stream with a digital circuit. According to another aspect of the invention, an apparatus, comprises: a buffer; a pulse generator coupled to the buffer; a modulator coupled to the pulse generator; and a oscillator coupled to the modulator, characterized in that the buffer and the pulse generator compose a digital circuit.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings. The invention may be better understood by reference to one or more of these drawings in combination with the description presented herein. It should be noted that the features illustrated in the drawings are not necessarily drawn to scale.

FIG. 1 illustrates a functional block diagram of a time or pulse-width modulation and demodulation system, representing an embodiment of the invention.

FIGS. 2A-2F illustrate waveforms at selected points of the system illustrated in FIG. 1.

FIGS. 10A-10F illustrate waveforms at selected points of the system illustrated in FIG. 9.

FIG. 11 illustrates a functional block diagram of a time-amplitude modulation system, representing an embodiment of the invention.

FIGS. 16A-16I illustrate waveforms at selected points of the system illustrated in FIG. 15.

FIG. 17 illustrates a functional block diagram of a quadrature pulse amplitude modulation system, representing an embodiment of the invention.

FIGS. 20A-20G illustrate waveforms at selected points of the system illustrated in FIG. 19.

DESCRIPTION OF PREFERRED EMBODIMENTS

Figure 3:
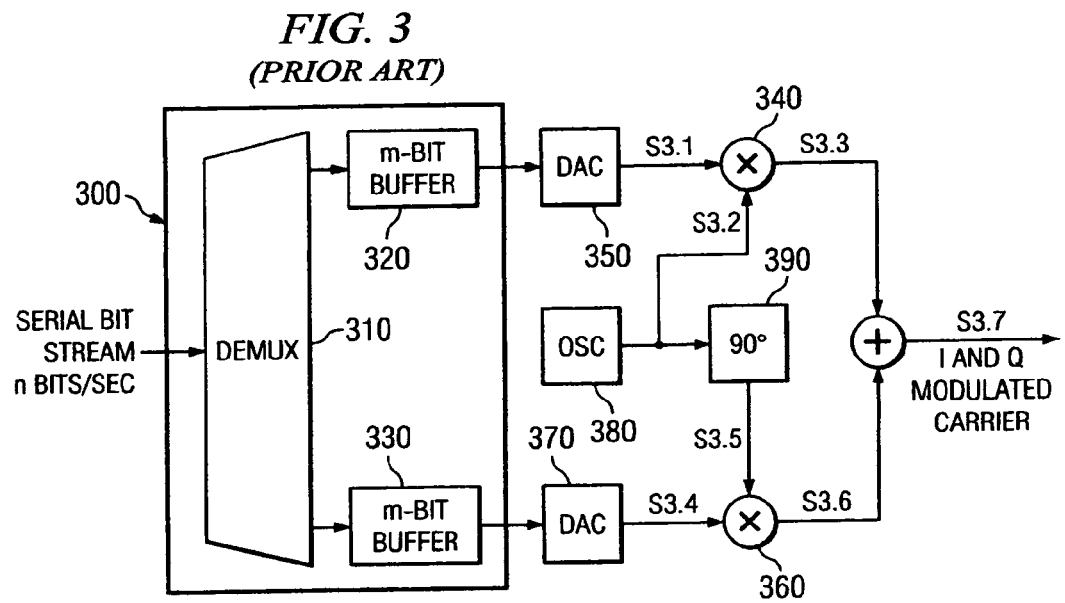
FIG. 3 illustrates a functional block diagram of a conventional quadrature amplitude modulation system, appropriately labeled "PRIOR ART."
Figure 4A:
FIGS. 4A-4G illustrate waveforms at selected points of the system FIG. 3, also appropriately labeled "PRIOR ART."
Figure 4B:
Figure 4C:
Figure 4D:
Figure 4E:
Figure 4F:
Figure 4G:

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The below-referenced U.S. Patents, and U.S. Patent Applications disclose embodiments that were satisfactory for the purposes for which they are intended. The entire contents of U.S. Pat. Nos. 5,987,601 and 5,146,358 are hereby expressly incorporated by reference herein for all purposes. The entire contents of U.S. Ser. No. 09/602,596, filed Jun. 22, 2000, now U.S. Pat. No. 6,445,326, issued Sep. 3, 2002 (and PCT/US01/19985, filed Jun. 21, 2001, published as WO 2001/099283 on Dec. 27, 2001) are hereby expressly incorporated by reference herein for all purposes. The entire contents of U.S. Patent Application 60/290,919, filed May 14, 2001 (and PCT/US02/15191, filed May 13, 2002; republished as WO 2002/0993752 on Feb. 12, 2004) are hereby expressly incorporated by reference herein for all purposes.

In general, the context of the invention can include the transfer of data. The context of the invention can include the transfer of data by radio frequency transmissions. The context of the invention can also include the transfer of data by incoherent light and/or coherent light transmissions. The context of the invention can even include the transfer of data by acoustic transmission. The physical context of the invention can include network(s), node(s), circuit board(s) and/or modems, especially high-speed modems.

The invention can include pulse-width modulation using precision timing to implement a very high-speed modem. Similarly, the invention can include pulse-width demodulation using precision timing to implement a very high-speed modem. The invention can include free-space transmissions or coaxial cable or data bus or wires for rf and free-space transmissions or light pipes or optical fibers for light.

The invention can include high speed modulation of a carrier by a bit stream, said modulation optionally taking place in an all digital process. The invention can include high speed demodulation of a carrier to recover a bit stream, said demodulation optionally taking place in an all digital process.

The invention can include an all-digital process to modulate and detect a carrier encoded as described above. If present, the analog portion of the modulator and demodulator are typical phase and amplitude devices, well known to practitioners of the art.

FIG. 1 shows the modulation of a suitable carrier by a stream of pulses whose width is determined by uniform partition segments of a bit or data stream. The demodulation pathway is also shown in FIG. 1.

Referring to FIG. 1, an m-Bit buffer 110 is coupled to a sub-cycle pulse generator 120. An oscillator 130 is coupled to a mixer 140. The sub-cycle pulse generator is also coupled to the mixer 140. The mixer 140 is coupled to a transmit subsystem 150. The transmit subsystem 150 is linked to a detector 160. As noted above, the link can be RF, coherent or incoherent light, or even acoustic. The detector 160 is coupled to a pulse shaping subsystem 170. The pulse shaping subsystem 170 is coupled to a sub-cycle timer 180. The sub-cycle times 180 is coupled to a counter 190.

The invention can include circuitry used generally employed to acquire the received carrier signal, synchronize the local oscillator, and down convert from the carrier frequency to an intermediate frequency or baseband signal before pulse shaping, in the Detector 160. Such functionality, while generally necessary to useful operation of any receiver, is well known to practitioners of the art and is generally understood to be required in any functional receiver. Such details are omitted in the figures and it is to be understood that a receiver can be fashioned along the same principles disclosed in the figures merely by employing the usual means of receiver front ends and then inverting the functional modules as indicated in FIG. 1. That is, each of the odd figures from FIG. 3 through FIG. 19 have receiver counterparts analogous to the Detector 160 of FIG. 1 and the subsequent pulse-shaping, sub-cycle timing, and counter modules thereof.

FIGS. 2A-2F depict waveforms for selected points of the system shown in FIG. 1. FIG. 2A shows a signal at point S1.1 of FIG. 1. FIG. 2B shows a signal at point S1.2 of FIG. 1. FIG. 2C shows a signal at point S1.3 of FIG. 1. FIG. 2D shows a signal at point S1.4 of FIG. 1. FIG. 2E shows a signal at point S1.5 of FIG. 1. FIG. 2F shows a signal at point S1.6 of FIG. 1.

The operation of the system shown in FIG. 1 can include pulse coding a data stream; and modulating a carrier signal using the pulse coded data stream, characterized in that the data stream is pulse coded with a digital circuit.

In a preferred embodiment, the carrier signal S1.2 can be a coherent light signal and the modulation of the coherent light signal can be effected utilizing a pulse modulated RF signal. For instance, the pulse modulated RF signal can be used to control a piezoelectric crystal that is coupled to an acousto-optic modulator through which the coherent light signal travels. This alternative embodiment is most advantageous because it can elegantly encode the optical carrier based on an electronic bit stream. In this way, the optical carrier can be quickly and efficiently encoded, thereby provided a very high bandwidth at low cost. The pulse modulated RF signal can include, for example, a discrete pulse width signal.

The invention can make use of the high speed precision analog to digital converter disclosed in U.S. Ser. No. 09/602, 596, now U.S. Pat. No. 6,445,326 (and PCT/US01/19985, filed Jun. 21, 2001, published as WO 2001/099283 on Dec. 27, 2001) and/or the high speed precision digital to analog converter disclosed in U.S. Ser. No. 60/290,919, filed May 14, 2001 (and PCT/US02/15191, filed May 13, 2002; republished as WO 2002/0993752 on Feb. 12, 2004) to keep the modulation and demodulation circuits on the main processor thus avoiding critical timing issues and potential bus contention problems as the data are moved to and from the auxiliary converters. The use of sub-cycle, precision timing in generating the modulating pulses and in measuring the width of the demodulated pulses provides additional control beyond that of standard amplitude and quadrature-amplitude modulation (QAM). Additionally, the control of pulse width provides yet another dimension or variable for encoding information into the carrier wave, be it acoustic (typically in the kilo Hertz to mega Hertz bands), light (typically visible and infrared laser or diode light), or rf (typically in the range of a few mega Hertz to giga Hertz and particularly in the unlicensed bands).

In a preferred embodiment, a bit stream or message coded as integers represented as binary numbers, is split into 4 independent streams. The 4 binary streams are partitioned or grouped into binary integers in groups of two. Each pair of integers is used to modulate a carrier in time and amplitude, one pair determines the in-phase portion of the combined carrier while the other determines the quadrature portion.

The term "sub-cycle" as used in this document refers to a sub-cycle of the clock controlling the digital circuit. This clock may be at the input data or bit rate, but is typically much slower as data is generally read into a digital device (e.g., microprocessor) in groups of 16, 32, 64, or 128 bits or more. Thus, the data rate expressed in bits per second is generally some power of 2 faster than the system clock. In a preferred embodiment of the invention, "sub-cycle" is used to indicate a fraction of the time between information bits. As an example, a sub-cycle interval may be (typically in 0.18 micron CMOS process) about 30 ps or less while the digital system clock may have a period of 4 ns (a 250 MHz clock) and the information rate may be 10 GHz corresponding to 0.1 ns or 100 ps. The sub-cycle period must be consistent with the m- and k-bit integers introduced below. For example, m bits when converted to a pulse width implies that the sub-cycle period be smaller than $2^{-m}$ times the single-bit period.

The magnitude of the sub-cycle timing affects the hardware complexity in that, for a given data rate and bandwidth, more hardware modules are required for encoding the data stream as the sub-cycle period increases. This is due to the fact that the bandwidth of the resulting symbol stream varies as the inverse of the symbol period, which in turn, is proportional to the sub-cycle timing period. There must be one such decoder for each frequency band and the plurality of frequency bands comprise the overall bandwidth of the encoded data stream.

An approach to encoding a data stream as taught in this document but without using sub-cycle timing is indeed possible, but the clock period for any useful size for m (as above) would imply such an inordinately long symbol time that the individual frequency bands would be small and the number of encoder modules correspondingly large for high data rates, resulting in a great increase in complexity and expense over that of a system making effective use of the sub-cycle method. In this sense, the use of sub-cycle timing for controlling both the widths and amplitudes of pulses corresponding to integer pairs extracted from a message or data stream is an enabling technological combination that is unique, nonobvious and useful, providing the holder of appropriate licenses to the claimed subject matter a decided advantage in high-speed communications.

The invention can partition a bit stream into groups, or words, that are converted into pulses whose length (time of duration) is proportional to the value of a group interpreted as a binary integer. The variations depicted in FIGS. 7, 9, 11, 13, 15, 17 and 19 show how the bit stream may be split into two or more parallel bit streams, where each of the sub streams may be likewise grouped into binary words whose values are variously converted into pulse widths, phase shifts, or amplitude levels. Combinations of each of these possibilities are shown. Yet another alternate method is to split the bit stream into two sub streams where each sub stream is converted into a pulse width, one pulse width being used to control the onset of the second pulse width as in FIG. 7. In this way, the modulated pulse stream conveys two pieces of information, both represented as times—the position (time variable 1) of the pulse of width representing time variable 2.

In more detail, consider a single pair of numbers. One number may have m bits while the other k bits. Each number can independently control a precision sub-cycle pulse-width generator of the kind described in U.S. Ser. No. 09/602,596, now U.S. Pat. No. 6,445,326 (and PCT/US01/19985, filed Jun. 21, 2001, published as WO 2001/099283 on Dec. 27, 2001) and/or the high speed precision digital to analog converter disclosed in U.S. Ser. No. 60/290,919, filed May 14, 2002 (and PCT/US02/15191, filed May 13, 2002; republished as WO 2002/0993752 on Feb. 12, 2004). Let the m-bit number control the width of the pulse under consideration while the k-bit number controls the amplitude of the oscillator signal being modulated. Typically, m is less than or equal to k since the width of a pulse, using the sub-cycle timing circuit, can be measured more accurately than the amplitude of a modulated carrier, especially following transmission through an imperfect communications channel. The pulse determined by the k-bit number is integrated to give a representation in amplitude (voltage) of its width and this amplitude value is locked into a sample-and-hold circuit. The result is used to amplitude-modulate the in-phase (or quadrature for the second pair of numbers) oscillation which may be the carrier itself or merely an intermediate signal that modulates the carrier. In the latter case, an example would be as in U.S. Pat. No. 5,146,358 wherein a modulated rf signal is used to acoustically excite a Bragg or acousto-optic cell thereby setting up acoustic waves that Bragg-scatter an incident light (diode or laser) beam; the scattered light beam containing the information present in the modulated rf signal.

The m-bit number likewise determines a pulse of precise width; it is this pulse that gates the amplitude-modulated oscillator signal. The result is a pulse having a width with m-bit precision and amplitude with k-bit precision. The second pair produces a similar pulse, but being typically 90 degrees out of phase with the oscillation frequency of the first pulse. The two pulses are then added linearly in a manner well-known to those familiar with the art of rf modulation. The resulting composite pulse has the frequency of the oscillator and a duration, in the four-stream example here, determined by twice the sum of m and k times the information bit rate. Thus an n-bit/second data stream is converted into a symbol stream that is 2(m+k) times slower, greatly relaxing the constraints placed on the digital hardware used in encoding and decoding the data.

Typical numbers for m and k might be 12 and 4, thereby converting a 1 GHz bit or information rate stream into a mere 31.25 MHz symbol stream. Digital hardware might have difficulty coping with a 1 GHz data rate, but one 32 times slower should prove rather easy. As hardware speeds improve, the method provided by the invention will keep pace, allowing ever faster data rates to by used. Today, state-of art optical modulators have m=0 and k=2, while state-of-art rf modulators have m=0 and k=4 or 5. These low values of 2(m+k) of 2 for optical modulation and 8 or 10 for rf modulation imply that the start-of-art digital techniques are hard put to compete with a typical value of 2(m+k) of 32 or more provided by the invention, especially when very high data rates are required.

The information content of a single combined-pulse signal is seen to reside in four dimensions or variables. Each of the quadrature amplitudes is an independent variable as is each of the quadrature pulse widths. Standard methods of demodulation may be employed on the receiving end to separate the two quadrature signals into two pulse streams. The pair of pulse streams are typically passed through an envelop detector and converted to a pair of base-band pulses each having an amplitude and width directly related to those of the original numerical message stream. The amplitudes of the pulses may be measured by standard analog-to-digital conversion methods, assuming that k is sufficiently small, while the pulse widths must be accurately measured with the sub-cycle precision timing method set forth in U.S. Ser. No. 09/602,596, filed Jun. 22, 2000, now U.S. Pat. No. 6,445,326, issued Sep. 3, 2002 (and PCT/US01/19985, filed Jun. 21, 2001, published as WO 2001/099283 on Dec. 27, 2001) to recover the precise m-bit number encoded in each of the pulse widths. For higher values of k, the sub-cycle timing methods are preferred.

Preferred embodiments of the invention rely in an integral way on the ability to control and measure pulses to a high degree of accuracy. Without sub-cycle capability, the particulars disclosed herein would have remained as generic possibilities rather than appearing as particular viable embodiments. The novelty and nonobviousness of the invention is substantiated in the following section that develops the particular mathematics and displays the signal equations underlying the functional block diagrams; these equations were used to plot waveforms shown in the figures.

Theoretical Explanation

The discussion here refers specifically to FIG. 17 in its details but may be seen to describe the generic transformations inherent in all the figures. FIG. 17 depicts an embodiment of the invention that may be termed quadrature pulse modulation or QPM.

If the message stream to be encoded by the QPM system is represented as a clocked bit stream with bit period $\tau_B$, the entire QPM operation may be most simply described by a sequence of functional equations. (A functional operates on a function to produce another function much like a function itself operates on numbers to produce numbers. Functionals are generalizations of the common transforms typically found in signal processing. The functionals employed here are both linear and invertible; linear in the sense that a functional of the sum of two functions will turn out to be the sum of two functionals and invertible in the sense that the information in an encoded message can be exactly recovered by applying the inverse functionals, which exist in all cases considered.) The result of carefully developing the mathematics of the encoding system leads to a better understanding of the functional nature of the digital circuits presented in the figures, gives a clearer understanding of the temporal sequence that must be embodied in timing and control circuitry that is implied in the figures, and provides a direct means of developing the inverse circuits for decoding the encoded signals once those signals are detected in the usual manner.

A sequence of bits may be represented as a binary vector of indefinite length where each $b_j$ is a zero or a one, thus the message sequence is represented as $$\bar{b} = \{b_0, b_1, b_2, \ldots, b_{j-1}, b_j, \ldots\}$$

where the index j refers to the position in time of the bit so referenced and the interval between bits is simply the bit period $\tau_B$; the time of occurrence of the binary digit $b_j$ is $t_0 + j\tau_B$ where $t_0$ is the time of occurrence of the first bit, $b_0$. Let L represent the functional that parses the bit stream into sequential blocks of bits of repeating lengths m and k grouped together in pairs, thus, $$L \circ \bar{b} \rightarrow \{\bar{b}_0^{(k,m)}, \bar{b}_1^{(k,m)}, \ldots, \bar{b}_j^{(k,m)}, \ldots\}$$

where $\bar{b}_j^{(k,m)}$ stands for the subsequence of binary bits $\{\bar{b}_j^{(k)}, \bar{b}_{j+k}^{(k)}, \bar{b}_{j+2k}^{(m)}, \bar{b}_{j+2k+m}^{(m)}\}$ and $\bar{b}_{j+p}^{(r)}$ stands for the sequence $\{b_{j+p}, b_{j+p+1}, \ldots, b_{j+p+r-1}\}$. Letting the functional I stand for the binary conversion of a sub vector of bit values into a quadruple of binary integers, $$I \cdot \overline{b}_{2j(k+m)}^{(k,n)} \rightarrow \begin{Bmatrix} \sum_{p=0}^{k-1} 2^p b_{2j(k+m)+p}, \\ \sum_{p=0}^{k-1} 2^p b_{2j(k+m)+k+p}, \\ \sum_{q=0}^{m-1} 2^q b_{2j(k+m)+k+m+q}, \\ \sum_{q=0}^{m-1} 2^q b_{2j(k+m)+2k+m+q} \end{Bmatrix} = \{i_{(j,1)}^{(k)}, i_{(j,2)}^{(k)}, i_{(j,3)}^{(m)}, i_{(j,4)}^{(m)}\}$$

where the subscripts (j,l) on the i integers represent the time index of the first bit in the sequence of k or m bits used to compute that integer in that (j,l)={j, j+k, j+2k, j+2k+m} for l={1, 2, 3, 4}. Note that when j is used as a sequential temporal index, the value of j increases by 2(k+m) for each group of 4 integers. At time $(j+2)(m+k)\tau_B$, the $j^{th}$ set of integers $\{i_j^{(k)}, i_{j+k}^{(k)}, i_{j+2k}^{(k)}, i_{j+2k+m}^{(m)}\}$ are presented to the two pairs of sub-cycle pulse generators as shown in FIG. 17, with the two (k)-index integers presented to the generators feeding the analog integrators. While the next quadruple set of integers are being processed by the combined functional I∘L applied to the message bit stream and the two m-bit sequences are being extracted, the two k-bit integers are converted by the functional P representing a sub-cycle conversion of the each input integer to a quadruple of pulse of lengths proportional to the converted binary integers as $$P \circ i_{(j,l)}^{(r)} \rightarrow \Delta_{(j,l)}^{(r)}$$

where the pulse widths represented by $\Delta_{(j,l)}^{(r)}$ are time values indicating the length of time between interval $(j+2)(m+k)\tau_B$ and $(j+4)(m+k)\tau_B$ where each respective pulse out of the digital circuit enclosed by the dotted (light) line rectangle in FIG. 17 is non-zero or high. The sub-cycle interval $\Delta_S$ must be chosen such that $2^m \Delta_S < 2(m+k)\tau_B$.

The composite functional representing the action of the digital circuit is represented as $$P \circ I \circ L \circ \overline{b} \rightarrow \{\{\Delta_{(0,1)}^{(k)}, \Delta_{(0,2)}^{(k)}, \Delta_{(0,3)}^{(m)}, \Delta_{(0,4)}^{(m)}\}, \ldots, \{\Delta_{(j,l)}^{(k)}, \Delta_{(j,l)}^{(k)}, \Delta_{(j,l)}^{(m)}, \Delta_{(j,l)}^{(m)}\}, \ldots\},$$

where the index j increases by 2(k+m). The sequence of output pulses is illustrated sequentially as S17.1 and S17.2 and S17.7 and S17.8 in FIG. 18. In the representation used here, the first two pulses in a set are indicated by S17.2 and S17.8 while the next two by S17.1 and S17.7. The output of the digital circuit illustrated in FIG. 17 is used to modulate an appropriate oscillator signal or carrier in the functional manner described below.

First, the first two members of each pulse set, the ones indexed (k) are converted into voltage or current (analog) levels by the combined action of an integrating circuit and a sample-and-hold circuit. This functional is specified by an integral over the time variable, t, that operates on the pulse of specified widths, the limits of integration being synchronous with the bit stream as indicated above:

$$G \cdot \Delta_{(j,l)}^{(k)} = \int_{\mathcal{P}_j}^{2(m+k)\tau_B + \zeta_j} \Delta_{(j,l)}^{(k)}(t) dt$$

where l is 1 or 2. Mathematically, the sample-and-hold function is represented in the integral limits, and as an ideal integration does not include leakage or lose of charge after the input drops to zero. In a real circuit, the integrator output decreases once the pulse level drops; the actual voltage levels are thereby prevented from decreasing by the sample-and-hold circuit.

In the circuitry, the sample-and-hold circuits ensure that the pulses represented by Δ with the superscript (m) select full-amplitude signals. This condition requires careful selection of the time-constants and ensuring that the (k) pulses arrive and are converted before the (m) pulses. In the integral above, the lower limit of integration, $\zeta_j$ is then chosen to be the presentation time of the (k) pulses, or $$\zeta_j = ((l-1)k + 2j(k+m))\tau_B.$$

where j is the index of the $j^{th}$ message bit and l is 1 or 2. The second sequential action of the encoder circuit is to present the last two members of the set to their respective sub-cycle generators. Since m≥k, this occurs after the first two (k) sequences are converted, given that the (k) sequence is produced and converted before the (m) sequence in both sections of the circuit.

The oscillator produces a sinusoidal signal c(t, v, φ), of frequency v and phase φ. As usual, the phase-shift introduces a π/2 radian shift in the phase φ, giving a second sinusoidal signal represented by c(t, v, φ+π/2). The mixer represented by ⊗ in the figures performs a functional operation of multiplication, also represented by ⊗ in the functional equations. Likewise, the adder represented by ⊕ in the drawings is represented by the functional symbol ⊕ in the mathematical representation. Hence, selecting the amplitude of the sinusoidal signal with the output of the sample-and-hold integration is functionally represented as $$G \circ \Delta_{(j,l)}^{(k)} \otimes c(t,v,\varphi)$$

and the summed output of the digital encoder is represented by the functional equation $$O(t) \circ \overline{b} = (G \circ \Delta_{(j,1)}^{(k)}) \otimes c(t,v,\varphi) \otimes (P \circ \Delta_{(j,3)}^{(m)}) \oplus (G \circ \Delta_{(j,2)}^{(k)}) \otimes c(t,v,\varphi+\pi/2) \otimes (P \circ \Delta_{(j,4)}^{(m)})$$

where O(t) is the functional that operates on the bit-stream input of the QPM digital encoder and converts said input to the output signal represented by the right-hand side of the above equation. Parentheses have been inserted for clarity. The output repeats for each group of 2(k+m) bits in the input or message stream. The composite mixer symbols in FIG. 17 are shorthand notation for the two separate functional multiplications shown in the above equation; their actual representation in hardware is typically done by a cascaded set of two mixers, consistent with the above functional equation.

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

Figure 5:
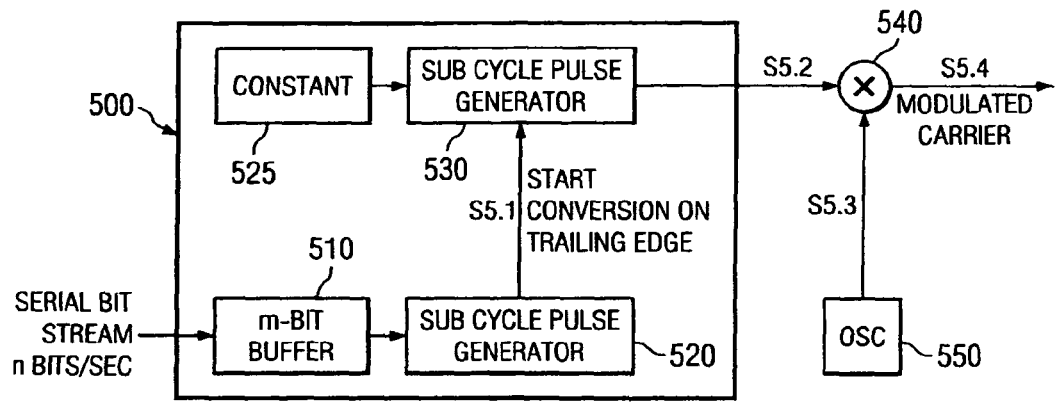
FIG. 5 illustrates a functional block diagram of a pulse-position modulation system, representing an embodiment of the invention.

FIG. 5. shows a configuration of a system that includes an all-digital portion 500 for modulating an oscillator signal according to position of a sequence of fixed pulses (whose width is determined by the "Constant"). Of course, the elements illustrated in FIG. 5 that are graphically positioned outside of the dotted (light) line representing circuit 500 can also be digital.

Referring to FIG. 5, a serial bit stream at n bits/second is provided to an m-bit buffer 510. The m-Bit buffer 510 is coupled to a first sub-cycle pulse generator 520. The first sub-cycle pulse generator 520 and a source of a constant 525 are coupled to a second sub-cycle pulse generator 530. The second sub-cycle pulse generator 530 is coupled to a mixer 540. An oscillator 550 is also coupled to the mixer 540. A modulated carrier is output from the mixer 540.

Figure 6A:
FIGS. 6A-6D illustrate waveforms at selected points of the system illustrated in FIG. 5.
Figure 6B:
Figure 6C:
Figure 6D:

FIGS. 6A-6D. show waveforms for selected points of the system shown in FIG. 5. FIG. 6A shows a signal at point S5.1 of FIG. 5. FIG. 6B shows a signal at point S5.2 of FIG. 5. FIG. 6C shows a signal at point S5.3 of FIG. 5. FIG. 6D shows a signal at point S5.4 of FIG. 5.

The operation of the system shown in FIG. 5 can include digitally pulse coding a data stream; modulating a carrier signal using the digitally pulse coded data stream; digitally pulse coding a constant; and pulse position modulating the digitally pulse coded constant with the digitally pulse coded data stream.

Example 2

Figure 7:
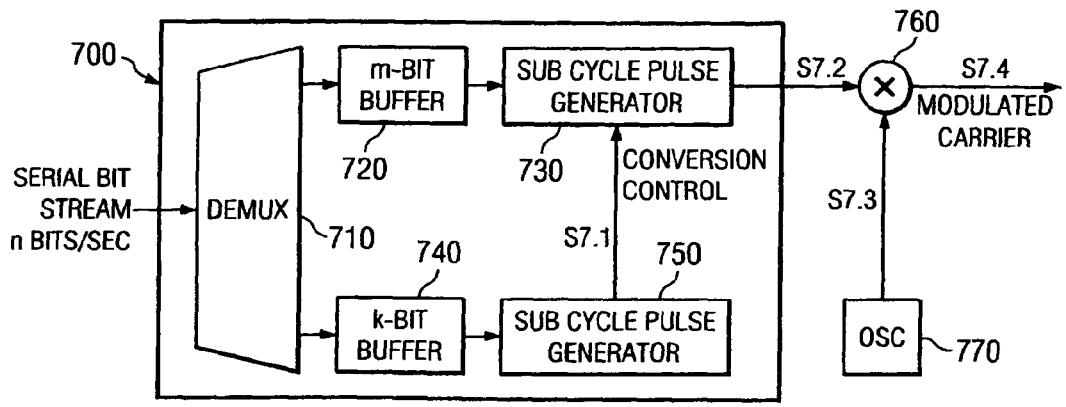
FIG. 7 illustrates a functional block diagram of a pulse-position and width modulation system, representing an embodiment of the invention.

FIG. 7 shows a modification of FIG. 5 to replace the constant pulse width with a variable width that depends on part of the incoming bit stream. The embodiment shown in FIG. 7 includes an all digital portion 700. Of course, the elements illustrated in FIG. 7 that are graphically positioned outside of the dotted (light) line representing portion 700 can also be digital.

Referring to FIG. 7, a serial bit stream of n bits/second is provided and split into two streams by a demux 710 (aka decoder). The demux 710 is coupled to an m-bit buffer 720. The m-bit buffer 720 is coupled to a first sub-cycle pulse generator 730. The demux 710 is also coupled to a k-bit buffer 740. The k-bit buffer 740 is coupled to a second sub-cycle pulse generator 750. The second sub-cycle pulse generator 750 is coupled to the first sub-cycle pulse generator 730. The first sub-cycle pulse generator is coupled to a mixer 760. An oscillator 770 is coupled to the mixer 760. A modulated carrier signal is output from the mixer 760. The number of bits represented by k can be less than the number of bits represented by m, the number of bits represented by k can be equal to the number of bits represented by m, or the number of bits represented by k can be greater than the number of bits represented by m.

The "DE MUX", more properly termed a decoder, separates the bit stream into two streams of equal or unequal numbers of bits. These bit packets or groups are then treated as binary integers and used to control pulse width with sub-cycle precision. The pulse generated on the bottom row of the figure determines the start of the pulse generated on the top row, resulting in the top-row pulse starting at a time determined by that of the bottom-row pulse and ending at a time determined by its own width. In this configuration, as well as in several of the other figures, an oscillator is not required; the pulse stream carrying information independently encoded in the width and amplitude of each pulse can be transmitted as wide-band rf following a filtering and amplification operation. In addition, the pulse stream can also be used directly to modulate a Bragg or acousto-optic cell without an intermediate rf stage. Such direct use of the pulses is practical only if the repetition rate of the pulses is sufficiently high to place the pulse spectrum into the desired spectral band (the pulse-stream spectrum is dominated by a sinc function whose parameters depend principally on the pulse repetition rate).

Figure 8A:
FIGS. 8A-8D illustrate waveforms at selected points of the system illustrated in FIG. 7.
Figure 8B:
Figure 8C:
Figure 8D:

FIGS. 8A-8D show waveforms for selected points of the system shown in FIG. 7. FIG. 8A shows a signal at point S7.1 of FIG. 7. FIG. 8B shows a signal at point S7.2 of FIG. 7. FIG. 8C shows a signal at point. S7.3 of FIG. 7. FIG. 8D shows a signal at point S7.4 of FIG. 7.

The operation of the system shown in FIG. 7 can include digitally pulse coding a data stream; modulating a carrier signal using the digitally pulse coded data stream; digitally pulse coding another data stream; and pulse position modulating the digitally pulse coded data stream with the another digitally pulse coded data stream.

Example 3

Figure 9:
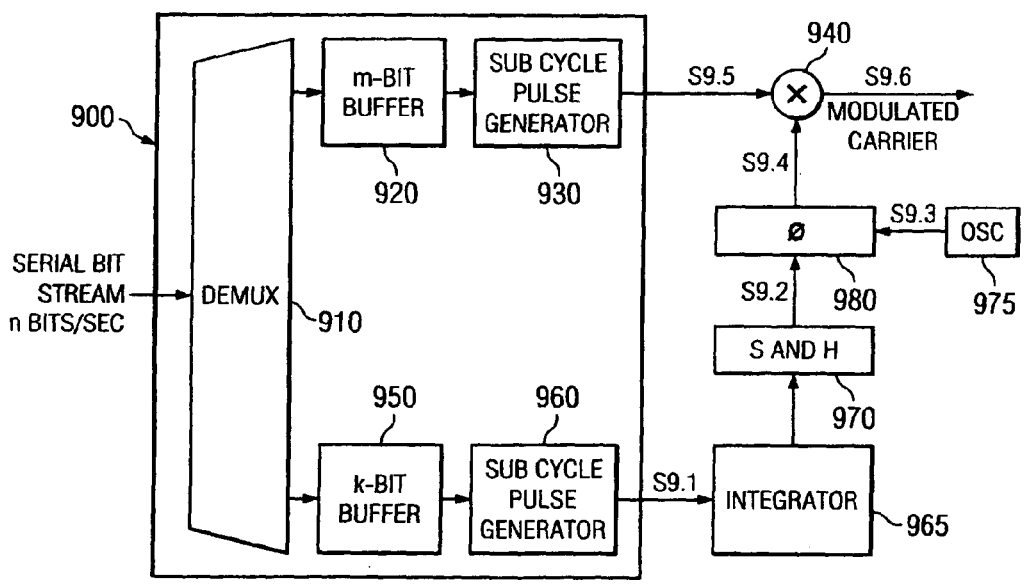
FIG. 9 illustrates a functional block diagram of a time-phase modulation system, representing an embodiment of the invention.

FIG. 9 shows a configuration of an all-digital circuit used to modulate an oscillator signal both in phase and in pulse width. The incoming information stream is split as in FIG. 7, the k-bit integer determines a pulse with sub-cycle precision, said pulse width being converted to a voltage level that in turn determines a phase shift, by conventional means, of an oscillator signal. The m-bit integer determines another pulse with sub-cycle precision, said pulse gating the phase-shifted oscillator signal, producing an output signal of specified phase and length.

The embodiment shown in FIG. 9 includes an all digital portion 900. Of course, the elements illustrated in FIG. 9 that are graphically depicted outside of the dotted (light) line representing portion 900 can also be digital.

Referring to FIG. 9, a serial bit stream of n bits/second is provided and split into two streams by a demux 910 (aka decoder). The demux 910 is coupled to an m-bit buffer 920. The m-bit buffer 930 is coupled to a first sub-cycle pulse generator. The first sub-cycle generator is coupled to a mixer 940. The demux 910 is also coupled to a k-bit buffer 950. The k-bit buffer 950 is coupled to a second sub-cycle pulse generator 960. The second sub-cycle generator 960 is coupled to an integrator 965. The integrator 965 is coupled to a sample and hold circuit 970. The sample and hold circuit 970 is coupled to a phase shifter 980 that is also coupled to an oscillator 975. The phase shifter 980 is coupled to the mixer 940. A modulated carrier signal is output from the mixer 940. Again, the number of bits represented by k can be less than the number of bits represented by m, the number of bits represented by k can be equal to the number of bits represented by m, or the number of bits represented by k can be greater than the number of bits represented by m.

FIGS. 10A-10F show waveforms for selected points of the system shown in FIG. 9. FIG. 10A shows a signal at point S9.1 of FIG. 9. FIG. 10B shows a signal at point S9.2 of FIG. 9. FIG. 10C shows a signal at point S9.3. of FIG. 9. FIG. 10D shows a signal at point S9.4 of FIG. 9. FIG. 10E shows a signal at point S9.5 of FIG. 9. FIG. 10F shows a signal at point S9.6 of FIG. 9.

The operation of the system shown in FIG. 9 can include digitally pulse coding a data stream; modulating a carrier signal using the digitally pulse coded data stream; digitally pulse coding a second data stream; and phase modulating the carrier signal with the pulse coded second data stream.

Example 4

FIG. 11 shows a modification of FIG. 9, replacing the phase modulation of the oscillator signal by an amplitude modulation thereof. The embodiment shown in FIG. 11 includes an all digital portion 1100. Of course, the elements illustrated in FIG. 11 that are graphically depicted outside of the dotted (light) line representing portion 1100 can also be digital.

Referring to FIG. 11, a serial bit stream at n bits/second is provided and split into two streams by a demux 1110 (aka decoder). The demux 1110 is coupled to an m-bit buffer 1120. The m-bit buffer is coupled to a first sub-cycle pulse generator 1130. The first sub-cycle pulse generator 1130 is coupled to a first mixer 1140. The demux 1110 is also coupled to a k-bit buffer 1150. The k-bit buffer 1150 is coupled to a second sub-cycle pulse generator 1160. The second sub-cycle generator 1160 is coupled to an integrator 1165. The integrator 1165 is coupled to a sample and hold circuit 1170. The sample and hold circuit 1170 is coupled to a second mixer 1190 that is also coupled to an oscillator 1180. The second mixer 1190 is coupled to the first mixer 1140. A modulated carrier signal is output from the first mixer 1140. Yet again, the number of bits represented by k can be less than the number of bits represented by m, the number of bits represented by k can be equal to the number of bits represented by m, or the number of bits represented by k can be greater than the number of bits represented by m.

Figure 12A:
FIGS. 12A-12F illustrate waveforms at selected points of the system illustrated in FIG. 11.
Figure 12B:
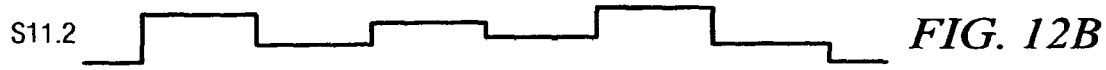
Figure 12C:
Figure 12D:
Figure 12E:
Figure 12F:

FIGS. 12A-12F show waveforms for selected points for selected points of the system shown in FIG. 11. FIG. 12A shows a signal at point S11.1 of FIG. 11. FIG. 12B shows a signal at point S11.2 of FIG. 11. FIG. 12C shows a signal at point S11.3 of FIG. 11. FIG. 12D shows a signal at point S11.4 of FIG. 11. FIG. 12E shows a signal at point S11.5 of FIG. 11. FIG. 12F shows a signal at point S11.6 of FIG. 11.

The operation of the system shown in FIG. 11 can include digitally pulse coding a data stream; modulating a carrier signal using the digitally pulse coded data stream; digitally pulse coding another data stream and amplitude modulating the carrier signal with the another pulse coded second data stream.

Example 5

Figure 13:
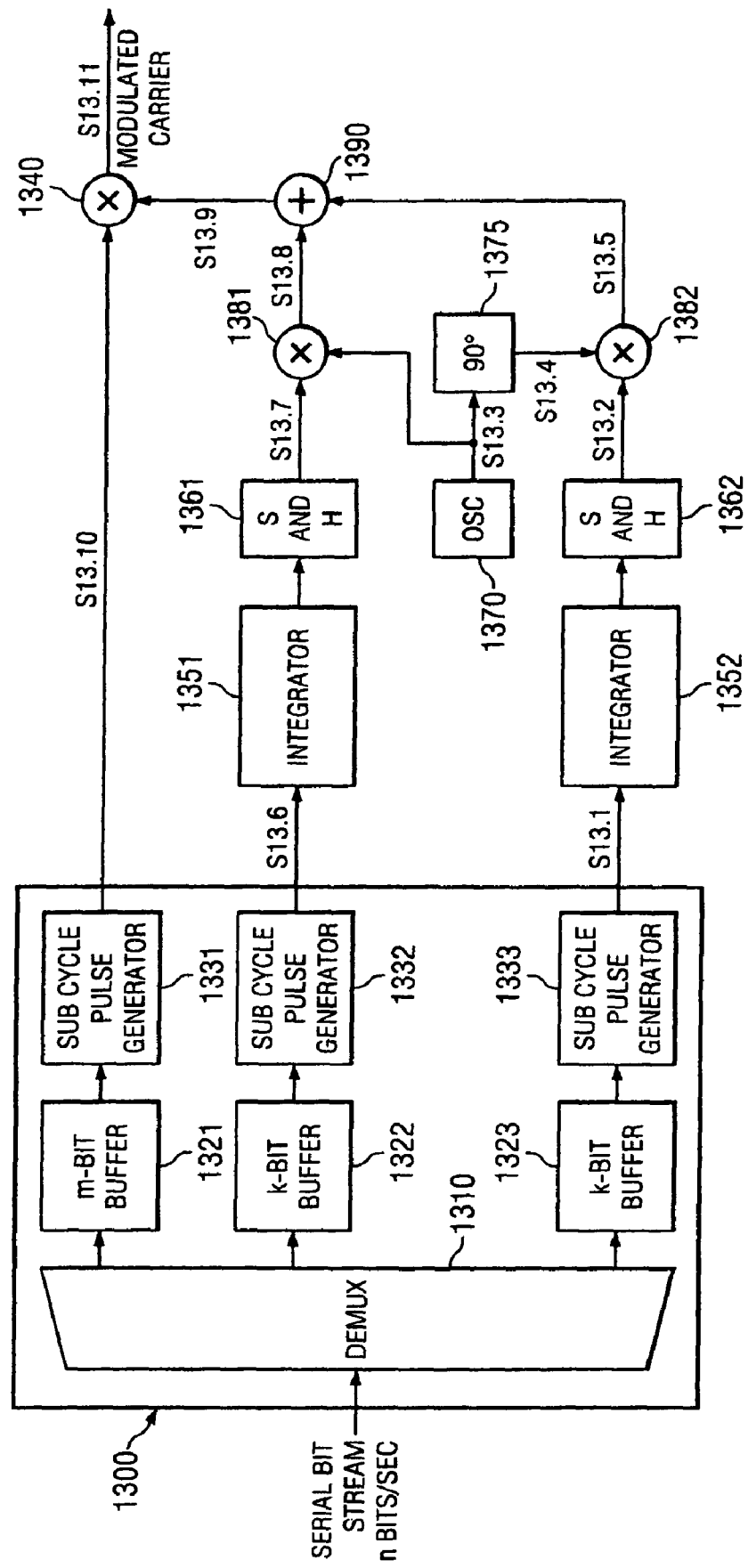
FIG. 13 illustrates a functional block diagram of a time-quadrature modulation system, representing an embodiment of the invention.

FIG. 13 shows a modification of FIG. 11, replacing the amplitude modulation by a quadrature amplitude modulation. This requires another bit stream being converted to pulse widths and thence to voltage levels that, in turn, modulate the quadrature portion of the oscillator obtained by inserting a 90 degree phase shift. Apart from the sub-cycle voltage level precision, the bottom two rows of the figure are essentially that of standard quadrature amplitude modulation. The precision-width pulse generated by the top row effectively determines the duration of the particular QAM signal produced by the bottom two rows of the figure.

The embodiment shown in FIG. 13 includes an all digital portion 1300. Of course, the elements illustrated in FIG. 13 that are graphically positioned outside of the dotted (light) line representing portion 1300 can also be digital.

Referring to FIG. 13, a serial bit stream of n bits/second is provided and split into three streams by a demux 1310 (aka decoder). The demux 1310 is coupled to an m-bit buffer 1321. The m-bit buffer 1321 is coupled to a first sub-cycle pulse generator 1331. The first sub-cycle pulse generator 1331 is coupled to a first mixer 1340. The demux 1310 is also coupled to a first k-bit buffer 1322. The first k-bit buffer 1322 is coupled to a second sub-cycle pulse generator 1332. The second sub-cycle pulse generator 1332 is coupled to a first integrator 1351. The first integrator 1351 is coupled to a first sample and hold circuit 1361. The first sample and hold circuit 1361 is coupled to a second mixer 1381. The second mixer 1381 is coupled to an adder 1390. The adder 1390 is coupled to the first mixer 1340. The demux 1310 is also coupled to a second k-bit buffer 1323. The second k-bit buffer 1323 is coupled to a third sub-cycle pulse generator 1333. The third sub-cycle pulse generator 1333 is coupled to a second integrator 1352. The second integrator is coupled to a second sample and hold circuit 1362. The second sample and hold circuit 1362 is coupled to a third mixer 1382. The third mixer 1382 is also coupled to the adder 1390. An oscillator 1370 is coupled to the second mixer 1381. The oscillator is also coupled to a 90° phase shifter 1375 that is in-turn coupled to the third mixer 1382. A modulated carrier signal is output from the first mixer 1340. Still again, the number of bits represented by k can be less than the number of bits represented by m, the number of bits represented by k can be equal to the number of bits represented by m, or the number of bits represented by k can be greater than the number of bits represented by m.

Figure 14A:
FIGS. 14A-14K illustrate waveforms at selected points of the system illustrated in FIG. 13.
Figure 14B:
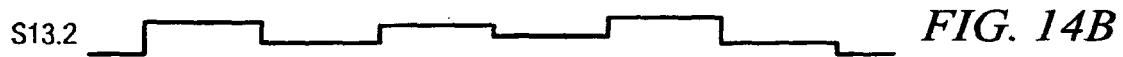
Figure 14C:
Figure 14D:
Figure 14E:
Figure 14F:
Figure 14G:
Figure 14H:
Figure 14I:
Figure 14J:
Figure 14K:

FIGS. 14A-14K show waveforms for selected points of the system shown in FIG. 13. FIG. 14A shows a signal at point S13.1 of FIG. 13. FIG. 14B shows a signal at point S113.2 of FIG. 13. FIG. 14C shows a signal at point S13.3 of FIG. 13. FIG. 14D shows a signal at point S13.4 of FIG. 13. FIG. 14E shows a signal at point S13.5 of FIG. 13. FIG. 14F shows a signal at point S13.6 of FIG. 13. FIG. 14G shows a signal at point S13.7 of FIG. 13. FIG. 14H shows a signal at point S13.8 of FIG. 13. FIG. 14I shows a signal at point S13.9 of FIG. 13. FIG. 14J shows a signal at point S13.10 of FIG. 13. FIG. 14K shows a signal at point S13.11 of FIG. 13.

The operation of the system shown in FIG. 13 can include digitally pulse coding a data stream; modulating a carrier signal using the digitally pulse coded data stream; digitally pulse coding a second data stream; amplitude modulating the carrier signal with the second digitally pulse coded data stream; digitally pulse coding a third data stream; phase shifting a portion of the carrier signal; amplitude modulating the phase shifted portion of the carrier signal; and adding the amplitude modulated carrier signal with the amplitude modulated phased shifted portion of the carrier signal.

Example 6

Figure 15:
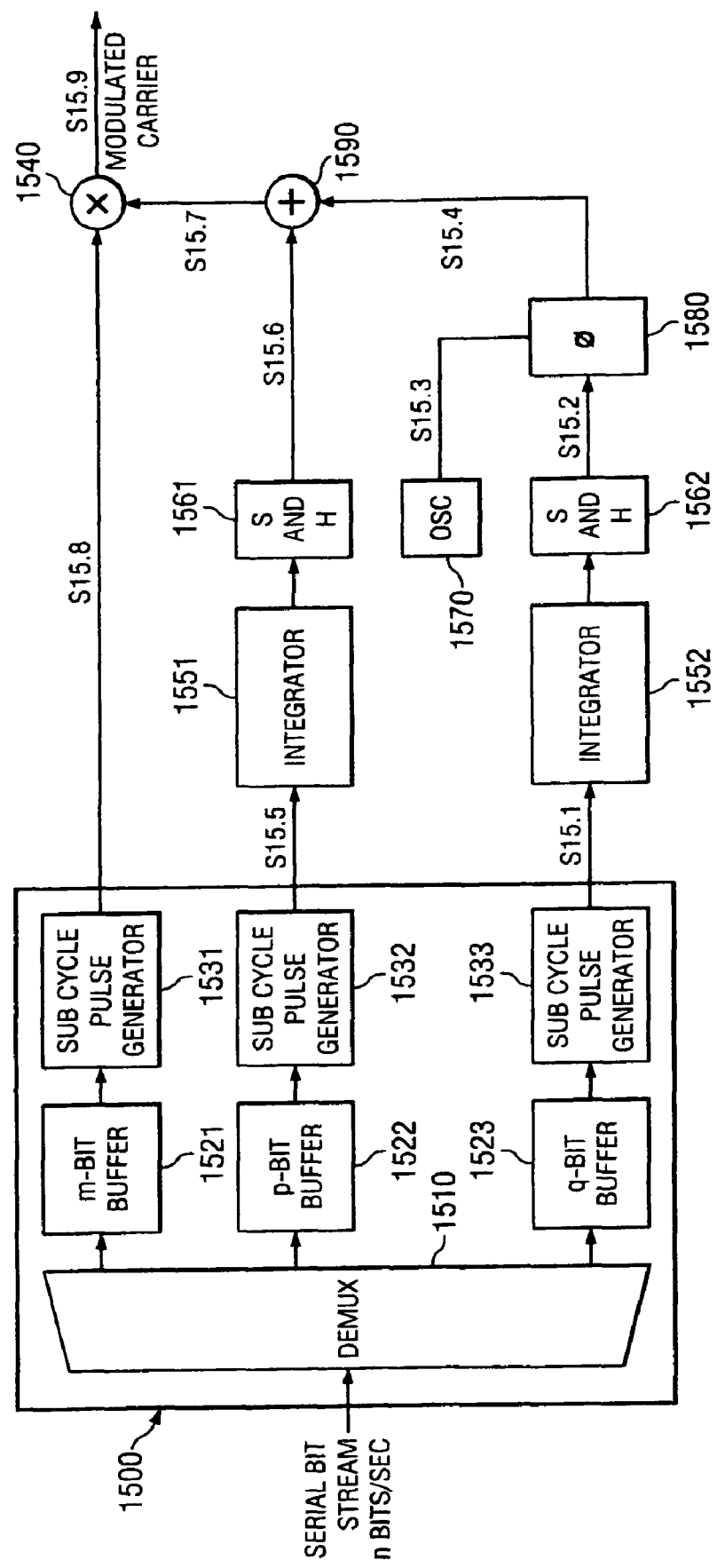
FIG. 15 illustrates a functional block diagram of a time-amplitude-phase modulation system, representing an embodiment of the invention.

FIG. 15 shows a variation of FIG. 11 wherein the amplitude modulated signal is phase-shifted according to the value of a k-bit value shown in the bottom row of the figure. The embodiment shown in FIG. 15 includes an all digital portion 1500. Of course, the elements illustrated in FIG. 15 that are graphically positioned outside of the dotted (light) line representing portion 1500 can also be digital.

Referring to FIG. 15, a serial bit stream of n bits/second is provided and split into three streams by a demux 1510 (aka decoder). The demux 1510 is coupled to an m-bit buffer 1521. The mi-bit buffer 1521 is coupled to a first sub-cycle pulse generator 1531. The first sub-cycle pulse generator 1531 is coupled to a first mixer 1540. The demux 1510 is also coupled to a p-bit buffer 1522. The p-bit buffer 1522 is coupled to a second sub-cycle pulse generator 1532. The second sub-cycle pulse generator 1532 is coupled to a first integrator 1551. The first integrator 1551 is coupled to a first sample and hold circuit 1561. The first sample and hold circuit 1561 is coupled to a second mixer 1590. The second mixer 1590 is coupled to the first mixer 1540. The demux 1510 is also coupled to a q-bit buffer 1523. The q-bit buffer 1523 is coupled to a third sub-cycle pulse generator 1533. The third sub-cycle pulse generator 1533 is coupled to a second integrator 1552. The second integrator 1552 is coupled to a second sample and hold circuit 1562. The second sample and hold circuit is coupled to a phase shifter 1580. An oscillator 1570 is also coupled to the phase shifter 1580. The phase shifter 1580 is coupled to the second mixer 1590. A modulated carrier signal is output from the first mixer 1540. The various r-bit counters in the several figures where r=n or k, or p, or q may have integer values of r the same or different in each figure and within a figure. Thus, in FIG. 15, m, p, and q may represent different or the same integers, or any of p or q or m could be different with the remaining two equal as may be required by the particulars of the encoding chosen.)

FIGS. 16A-16I show waveforms for selected points of the system shown in FIG. 15. FIG. 16A shows a signal at point S15.1 of FIG. 15. FIG. 16B shows a signal at point S15.2 of FIG. 15. FIG. 16C shows a signal at point S15.3 of FIG. 15. FIG. 16D shows a signal at point S15.4 of FIG. 15. FIG. 16E shows a signal at point S15.5 of FIG. 15. FIG. 16F shows a signal at point S15.6 of FIG. 15. FIG. 16G shows a signal at point S15.7 of FIG. 15. FIG. 16H shows a signal at point S15.8 of FIG. 15. FIG. 16I shows a signal at point S15.9 of FIG. 15.

The operation of the system shown in FIG. 15 can include digitally pulse coding a data stream; modulating a carrier signal using the digitally pulse coded data stream; digitally pulse coding a second data stream; phase modulating the carrier signal with the second digitally pulse coded data stream; digitally pulse coding a third data stream; and amplitude modulating the phase modulated carrier signal.

Example 7

FIG. 17 shows quadrature pulse modulation (QPM) which is a preferred embodiment for the invention. Here, the incoming bit stream is divided into four parts, with two parts determining the amplitudes of an in-phase and quadrature oscillator signal, while the remaining two parts determine the durations of the two quadrature amplitudes. In this configuration, the presence of the oscillator is necessary to make use of both dual data streams, however any two orthogonal signals may be substituted for the two quadrature signals without altering the utility of the device.

The embodiment shown in FIG. 17 includes an all digital portion 1700. Of course, the elements illustrated in FIG. 17 that are graphically positioned outside of the dotted (light) line representing portion 1700 can also be digital.

Referring to FIG. 17 a serial bit stream at n bits/second is provided and split into four streams by a demux 1710 (aka decoder). The demux 1710 is coupled to a first m-bit buffer 1721. The first m-bit buffer 1721 is coupled to a first sub-cycle pulse generator 1731. The first sub-cycle pulse generator 1731 is coupled to a first mixer 1740. The first mixer is coupled to an adder 1790. The demux 1710 is also coupled to a first k-bit buffer 1722. The first k-bit buffer is coupled to a second sub-cycle pulse generator 1732. The second sub-cycle pulse generator 1732 is coupled to a first integrator 1751. The first integrator 1751 is coupled to a first sample and hold circuit 1761. The first sample and hold circuit 1761 is coupled to the first mixer 1740. The demux 1710 is also coupled to a second k-bit buffer 1723. The second k-bit buffer 1723 is coupled to a third sub-cycle pulse generator 1733. The third sub-cycle pulse generator 1733 is coupled to a second integrator 1752. The second integrator 1752 is coupled to a second sample and hold circuit 1762. The second sample and hold circuit 1762 is coupled to a second mixer 1780. The second mixer 1780 is coupled to the adder 1790. The demux 1710 is also coupled to a second m-bit buffer 1724. The second m-bit buffer 1724 is coupled to a fourth sub-cycle pulse generator 1734. The fourth sub-cycle pulse generator 1734 is coupled to the second mixer 1780. An oscillator 1770 is coupled to the first mixer 1740. The oscillator is also coupled to a 90° phase shifter 1775. The phase shifter 1775 is coupled to the second mixer 1780. A modulated carrier signal is output from the adder 1790. The two m values are typically the same as are the two k values. The resulting signal is generally simpler to decode. However, this preference should not be construed as restricting the invention as each q-bit buffer in FIG. 17 could have a different value of q, and retain consistency with the purpose of the invention.

Figure 18A:
FIGS. 18A-18K illustrate waveforms at selected points of the system illustrated in FIG. 17.
Figure 18B:
Figure 18C:
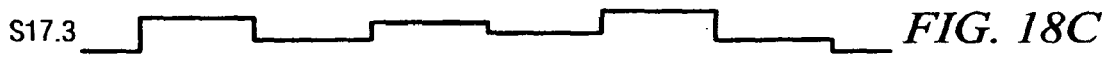
Figure 18D:
Figure 18E:
Figure 18F:
Figure 18G:
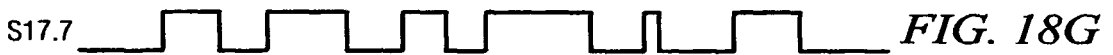
Figure 18H:
Figure 18I:
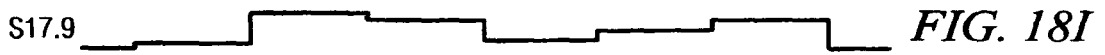
Figure 18J:
Figure 18K:

FIGS. 18A-18K show waveforms for selected points of the system shown in FIG. 17. FIG. 18A shows a signal at point S17.1 of FIG. 17. FIG. 18B shows a signal at point S17.2 of FIG. 17. FIG. 18C shows a signal at point S17.3 of FIG. 17. FIG. 18D shows a signal at point S17.4 of FIG. 17. FIG. 18E shows a signal at point S17.5 of FIG. 17. FIG. 18F shows a signal at point S17.6 of FIG. 17. FIG. 18G shows a signal at point S17.7 of FIG. 17. FIG. 18H shows a signal at point S17.8 of FIG. 17. FIG. 18I shows a signal at point S17.9 of FIG. 17. FIG. 18J shows a signal at point S17.10 of FIG. FIG. 18K shows a signal at point S17.11 of FIG. 17.

The operation of the system shown in FIG. 17 can include digitally pulse coding a data stream; modulating a carrier signal using the digitally pulse coded data stream; digitally pulse coding a second data stream; pulse modulating a phase shifted portion of the carrier signal with the second pulse coded data stream; adding the pulse modulated phase shifted portion of the carrier signal to the pulse modulated carrier signal; digitally pulse coding a third data stream; amplitude modulating the carrier signal with the third pulse coded data stream; digitally pulse coding a fourth data stream; and amplitude modulating the phase shifted portion of the carrier signal with the fourth pulse coded data stream.

Example 8

Figure 19:
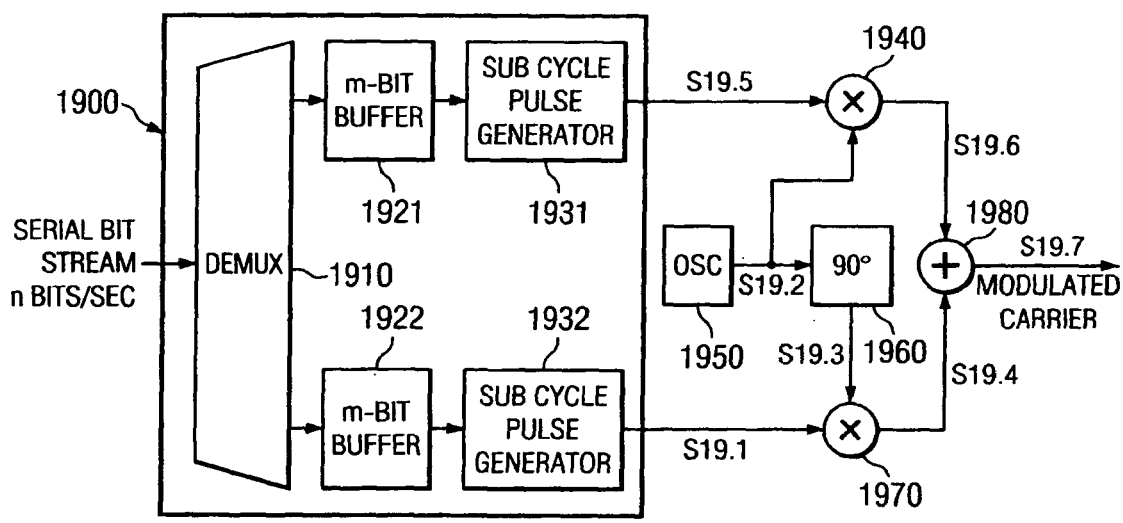
FIG. 19 illustrates a functional block diagram of a quadrature pulse modulation system, representing an embodiment of the invention.

FIG. 19 shows a variation of the system shown in FIG. 17 wherein the amplitude modulated subsystems are omitted. The embodiment shown in FIG. 19 includes an all digital portion 1900. Of course, the elements illustrated in FIG. 19 that are graphically positioned outside of the dotted (light) line representing portion 1900 can also be digital.

Referring to FIG. 19, a serial bit stream having a data rate of n bits/second is provided and split into two streams by a demux 1910 (aka decoder). The demux 1910 is coupled to a first m-bit buffer 1921. The first m-bit buffer 1921 is coupled to a first sub-cycle pulse generator 1931. The first sub-cycle pulse generator 1931 is coupled to a first mixer 1940. The first mixer 1940 is coupled to an adder 1980. The demux 1910 is also coupled to a second m-bit buffer 1922. The second m-bit buffer 1922 is coupled to a second sub-cycle pulse generator 1932. The second sub-cycle pulse generator 1932 is coupled to a second mixer 1970. The second mixer is coupled to the adder 1980. An oscillator 1950 is coupled to the first mixer 1940. The oscillator 1950 is also coupled to the second mixer 1970 via a 90° phase shifter 1960. A modulated carrier signal is output from the adder 1980.

FIGS. 20A-20G show waveforms for selected points of the system shown in FIG. 19. FIG. 20A shows a signal at point S19.1 of FIG. 19. FIG. 20B shows a signal at point S19.2 of FIG. 19. FIG. 20C shows a signal at point S19.3 of FIG. 19.

FIG. 20D shows a signal at point S19.4 of FIG. 19. FIG. 20E shows a signal at point S19.5 of FIG. 19. FIG. 20F shows a signal at point S119.6 of FIG. 19. FIG. 20G shows a signal at point S19.7 of FIG. 19.

The operation of the system shown in FIG. 19 can include digitally pulse coding a data stream; modulating a carrier signal using the digitally pulse coded data stream; digitally pulse coding a second data stream; pulse modulating a phase shifted portion of the carrier signal with the second pulse coded data stream; and adding the pulse modulated phase shifted portion of the carrier signal to the pulse modulated carrier signal.

Alternative Embodiments

In all of the functional block diagrams, the oscillator and modulation (multiplication) circuitry may be replaced by analog or digital pulse-shaping circuitry. Instead of orthogonal sinusoidal waves (i.e., quadrature signals), one would then employ orthogonal pulse-shaping filters. The ensuing pulses would be summed at the output as shown, for example, in FIG. 17. In such a case, the two dual paths shown in FIG. 17 would be replaced by a plurality of dual paths wherein the data stream would be subdivided into 2 N streams instead of 4 streams, where N is the number of orthogonal pulses to be combined.

Practical Applications of the Invention

A practical application of the invention that has value within the technological arts is the modulation and/or demodulation of data (analog or digital). The invention is useful in conjunction with a modem (e.g., a very high-speed modem). Further, the invention is useful in conjunction with the transmission of acoustic signals, in conjunction with the transmission of radio frequency signals (such as are used for the purpose of cellular and/or packet communications), or in conjunction with the transmission of higher frequency signals, for instance incoherent or coherent light (such as are used for the purpose of fiber optic or free-space laser communications), or the like. For instance, the invention is useful in the context of a modem (e.g., a very high-speed modem). There are virtually innumerable uses for the invention, all of which need not be detailed here.

Advantages of the Invention

A pulse width and/or position modulation and/or demodulation approach, representing an embodiment of the invention, can be cost effective and advantageous for at least the following reasons. The invention enables greater bandwidth within a given spectrum. The invention improves quality and/or reduces costs compared to previous approaches.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as close to a given value (e.g., preferably within 10% of, more preferably within 1% of, and most preferably within 0.1% of). The term substantially, as used herein, is defined as largely but not necessarily wholly that which is specified. The term generally, as used herein, is defined as approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

All the disclosed embodiments of the invention disclosed herein can be made and used without undue experimentation in light of the disclosure. The invention is not limited by theoretical statements recited herein. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually all configurations. Further, variation may be made in the steps or in the sequence of steps composing methods described herein. Further, although the systems shown in the functional block described herein can be a separate module, it will be manifest that the systems may be integrated with the other systems with which they are associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. An apparatus, comprising:
a buffer;
a pulse generator coupled to the buffer;
a modulator communicatively coupled to the pulse generator;
an oscillator coupled to the modulator, characterized in that the buffer and the pulse generator compose a digital circuit; and
a sub clock cycle pulse generator coupled between the pulse generator and the modulator; and a source of a constant coupled to the sub clock cycle pulse generator.

2. An apparatus, comprising:
a buffer;
a pulse generator coupled to the buffer;
a modulator communicatively coupled to the pulse generator; and an oscillator coupled to the modulator, characterized in that the buffer and the pulse generator compose a digital circuit, wherein the pulse generator provides sub clock cycle precision with regard to a clock that is controlling the digital pulse generator.

3. The apparatus of claim 2, wherein the modulator includes a surface-acoustic-wave modulator.

4. The apparatus of claim 2, wherein said modulator includes an acousto-optic modulator that is coupled to a piezoelectric crystal.

5. The apparatus of claim 2, further comprising a sub clock cycle pulse generator coupled between the pulse generator and the modulator; and a source of a constant coupled to the sub clock cycle pulse generator.

* * * * *